Patented Mar. 5, 1929.

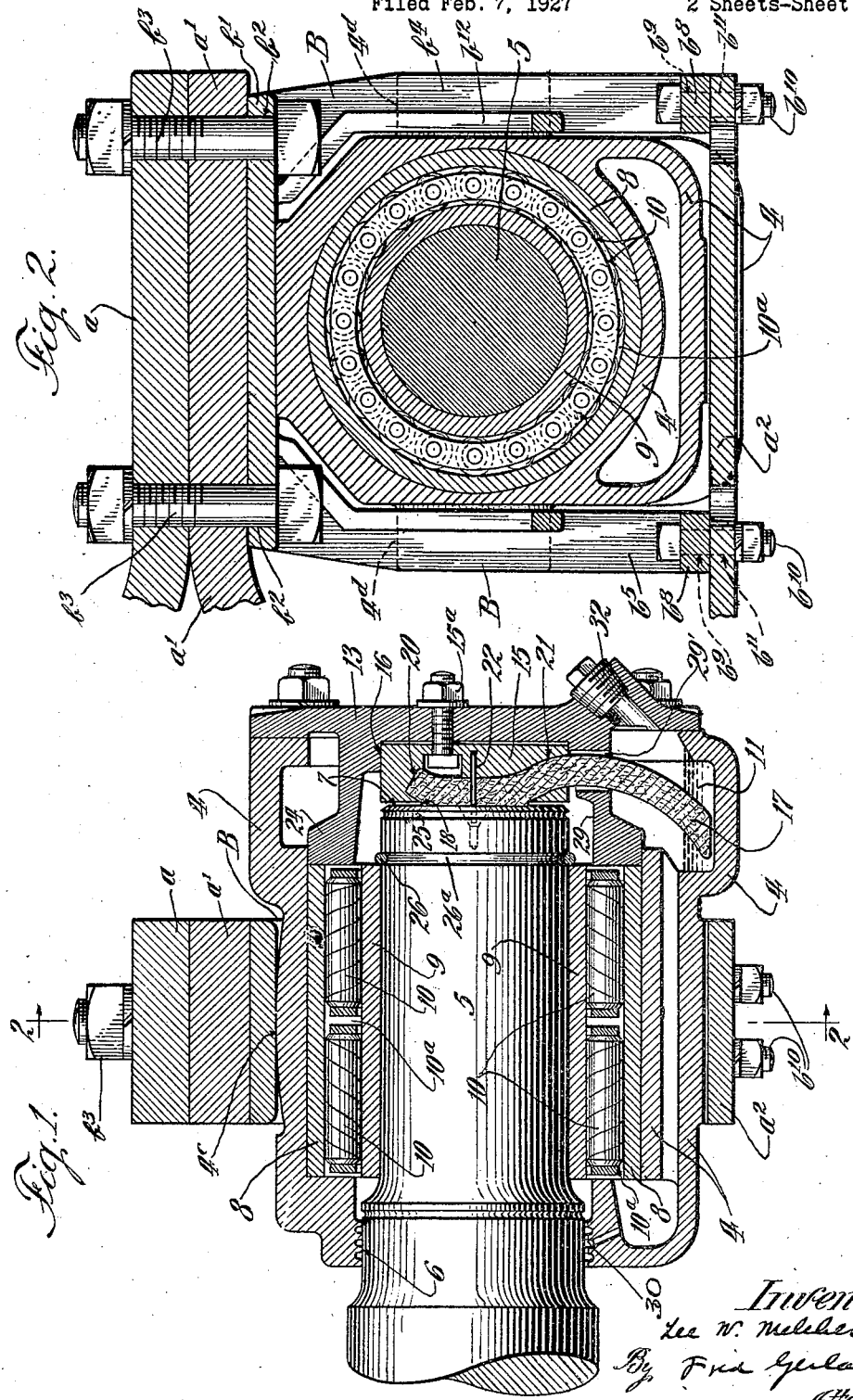

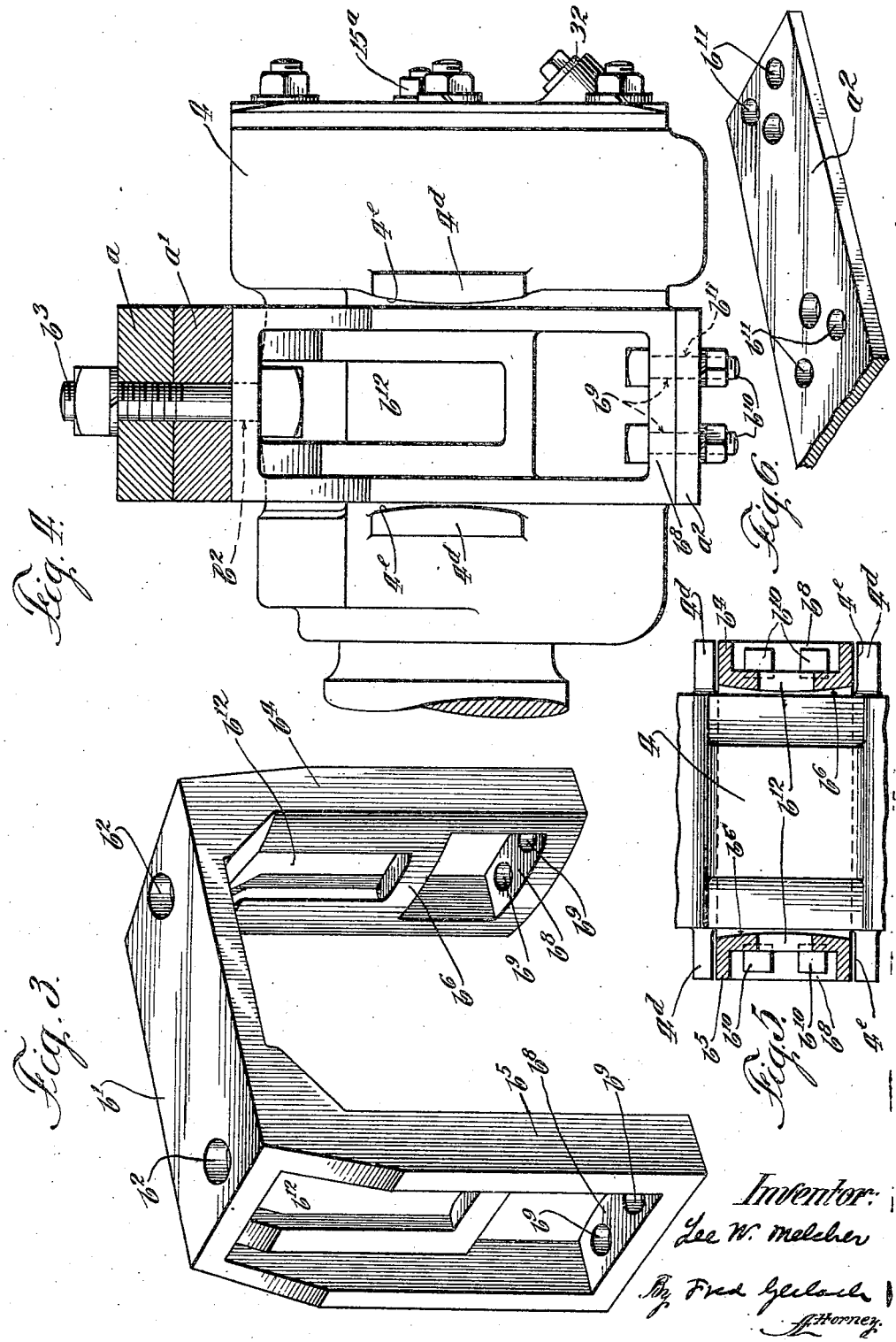

1,704,052

UNITED STATES PATENT OFFICE.

LEE W. MELCHER, OF WEST DE PERE, WISCONSIN.

CAR-AXLE BEARING FOR TRUCKS.

Application filed February 7, 1927. Serial No. 166,300.

The invention relates to car axle bearings for trucks.

One object of the invention is to provide a structure which permits proper self-alignment of a roller type of bearing. Another object of the invention is to provide an improved pedestal, which is adapted to retain a roller-bearing in the frame, of a construction which permits it to be readily substituted for pedestals or journal boxes now in use for plain bearings without substantial change in the truck-frame. Other objects will appear from the specification.

The invention consists in the several novel features hereinafter set forth and more particularly defined by claims at the conclusion hereof.

In the drawings: Fig. 1 is a longitudinal section of a bearing structure, the axle being shown in elevation. Fig. 2 is a section taken on line 2—2 of Fig. 1. Fig. 3 is a perspective of the improved pedestal. Fig. 4 is a side elevation. Fig. 5 is a horizontal section of the yoke, the box being shown in elevation. Fig. 6 is a detail of one end of the brace for the lower end of the pedestal.

The invention is exemplified with a truck of the arch-bar type comprising an arched bar $a$, an inverted arched bar $a'$, a pedestal brace or tie-bar $a^2$ and a pedestal B secured between the arch-bars and said tie-bar. A journal-box or casing 4 is confined in the pedestal and an axle 5 extends through an opening 6 in one end of the box and terminates in a transverse face within and near the other end of the box. An outer race or bushing 8 is pressed and fixedly held in the box and an inner race or bushing 9 is shrunk or otherwise fixedly held on the axle 5. A locking ring 26 for the bushing 9 may be secured in a peripheral groove $26^a$ in the axle. Two annular series of bearing rollers 10, suitably spaced in cages $10^a$, are confined between the races and constitute a roller bearing for supporting the box from the axle. The outer end of the box 4 has an opening which is closed by a removable end cap or cover 13 which is bolted to the box to permit access to the roller bearings and their insertion into the box. A circular thrust block 15, usually of brass, is secured by a bolt $15^a$ in a recess 16 formed in the inner face of the cap 13, and is normally spaced slightly away from the end-face 7 of the axle. This block carries a vertically extending wick and has its inner face formed with an opening 18 to expose a portion of the wick to contact with and apply lubricant only to the central portion of the end-face of the axle, so that oil may travel outwardly and away from the wick under the influence of centrifugal force. The lower end of the wick extends into an oil well 11 formed in the lower portion of the box to continuously supply oil by capillary attraction to the end-face of the axle. Above and below its exposed portion in the opening 18, the wick is contained in outwardly inclined upper and lower openings 20 and 21 in the block 15. A pin 22, carried by said block, extends into the wick to hold it against displacement. An annular wall 24, integrally formed with the cap 13, extends longitudinally inward therefrom to meet the outer face of the race 8 adjacent the outer ends of the rollers to catch oil thrown outwardly from the axle by centrifugal force, and to conduct it to the space in which the rollers travel, the lower portion of this wall being sloped downwardly and inwardly for that purpose, as at 29. An annular groove 25 is formed in the axle adjacent the end face 7 to interrupt the movement of the oil inwardly from the outer end of the axle, and so that it will be projected by centrifugal force against the wall 24 for conduction to the roller bearings. The wick 17 extends through an opening 29' in the lower portion of wall 24 into the outer end of the oil well 11. The outer periphery of the wall 24 is formed to fit in the wall of the box 4, in which the race 8 is secured. The usual oil and dust seal 30 is provided at the inner end of the box and adjacent the opening 6. The cap 13 is provided with a filler plug 32. In operation, the oil will be applied by the wick 17 to the central portion of the end-face of the axle. In rotation, the axle will cause the oil to be thrown outwardly by centrifugal force against the annular wall 24 which will conduct it to the roller bearings. After working through the latter, it will pass back into the inner end of the well 11 for re-circulation.

In practice, it is important that the journal boxes should be sustained to permit them to be self-aligning with respect to the axle, particularly when a roller bearing is used between the axle and the box, and by supporting the box so it is free to rock universally about a point located substantially at the longitudinal center of the roller bearing, the box will be retained so it may align itself with the axle under all conditions, without subjecting the roller bearing to any objectionable stresses. The pedestal B comprises a top wall $b'$ which is provided with holes $b^2$ for bolts $b^3$ which secure it to the lapped portions of the arch-bars $a$, $a'$, and legs $b^4$, $b^5$, between which the box 4 is confined. To permit the box to tilt vertically, substantially coincident with the axis of the axle and the longitudinal center of the roller bearing, the top wall of the box, where it bears against the wall $b'$ of the pedestal, is curved longitudinally, as at $4^c$, and lugs $4^d$, which project from the sides of the box to confine it longitudinally in the pedestal, are formed with curved surfaces $4^e$, and to permit pivotal horizontal movement about said point, the inner faces of the legs $b^4$, $b^5$ of the pedestal are curved, at at $b^6$. As a result of this construction, the box will be confined in the pedestal so it may pivot universally about a point coincident with the axis and longitudinal center of the roller bearing.

In practice, it is desirable to provide a construction of roller bearing which may be substituted for the plain bearings now in use, and is applicable to standard truck frames, in which the pedestals are usually secured by bolts extending continuously through the arch bars and the tie bar. For this purpose, the holes $b^2$ for the bolts $b^3$ are disposed to register with the holes placed according to standard practice, in the arch-bars, and in lieu of using continuous bolts, the short bolts are used to secure the top plate $b'$ of the pedestal to the arch bars. In boxes for roller bearings, the through bolts, according to standard practice, are not spaced apart sufficiently to permit boxes containing roller bearings to be placed in the pedestal. To make it possible to conveniently apply such boxes to standard truck frames, legs $b^4$ and $b^5$ are spread apart sufficiently to receive the box for containing a roller bearing, and the lower ends of the legs are each provided with a cross wall $b^8$ formed with two holes $b^9$ for short bolts $b^{10}$ which pass through said wall and holes $b^{11}$ which are drilled in the tie-bar. As a result, the only change necessary in the truck frame is the drilling of the holes $b^{11}$ to register with holes $b^9$ in the pedestal legs. Each pedestal leg comprises a cross-wall and side flanges. The cross-walls are each provided with openings $b^{12}$ to permit a bolt $b^3$ to be inserted into the holes in the arch-bars.

The invention thus exemplifies a car axle bearing of the roller type with a box which is universally and pivotally movable around a point substantially or approximately coincident with the axis and the longitudinal center of the bearing, which will relieve the bearings of destructive or objectionable stresses, and the self-alignment of the box axle with the axle. The invention also exemplifies a pedestal which is adapted to be substituted for the standard pedestal or journal box and to retain a box containing a roller bearing.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a car-truck frame comprising a pedestal, of a box in the pedestal, an axle extending into one end of the box, a roller-bearing between the axle and the box, curved surfaces between the pedestal and the box which permit the box to rock vertically and laterally about a point approximately coincident with the axis and longitudinal center of the bearing.

2. The combination with a car-truck frame comprising a pedestal, of a box in the pedestal, an axle extending into one end of the box, a roller-bearing between the axle and the box, retaining lugs projecting from the sides of the box to engage the legs of the pedestal having vertically curved surfaces to engage the pedestal and permit the box to rock vertically, and horizontally curved surfaces on the legs of said pedestal to permit the box to rock laterally about a point approximately coincident with the axis and longitudinal center of the bearing.

3. In a car-truck, the combination of a frame comprising a pedestal tie-bar; a pedestal comprising a top having holes to register with bolt holes located according to standard practice, and legs spaced apart a greater distance than standard practice; each leg having side flanges, a cross-wall and a bottom provided with bolt holes, bolts passing through the holes in the pedestal-top and the frame, and separate bolts extending through the holes in the pedestal legs and the tie-bar, a journal-box confined between the legs of the pedestal, an axle extending into the box and a roller bearing between the axle and the box.

4. A pedestal for a car-truck frame comprising a top and legs, the top being provided with holes to register with bolt-holes located in a frame according to standard practice, the legs being separated sufficiently to receive a box with a roller-bearing therein, having at their lower ends portions with bolt-holes spaced apart a greater distance than standard practice, so they may be secured to a tie-bar by separate bolts.

5. A pedestal for a car-truck frame comprising a top and legs, the top being provided with holes to register with bolt holes located in a frame according to standard practice, the legs being separated sufficiently to receive a box with a roller-bearing therein, having a their lower ends portions with bolt-holes spaced apart a greater distance than standard practice, so they may be secured to a tie-bar by separate bolts, each leg comprising side flanges and a cross-web.

6. A pedestal for a car-truck frame comprising a top and legs, the top being provided with holes to register with bolt holes located in a frame according to standard practice, the legs being separated sufficiently to receive a box with a roller bearing therein, having at their lower ends portions having holes spaced apart a greater distance than the standard practice, so they may be secured to a tie-bar by separate bolts, each leg comprising side-flanges, and a cross-web having slots therein for the top bolts.

7. A pedestal for a car-truck frame comprising a top and legs, the top being provided with holes to register with bolt holes located in a frame according to standard practice, the legs being separated sufficiently to receive a box with a roller bearing therein, having at their lower ends portions with holes spaced apart a greater distance than the standard practice, so they may be secured to a tie-bar by separate bolts, each leg comprising side flanges, a cross-web and a cross-wall forming the portions in which the holes for the tie-bar bolts are formed.

8. In a car truck, the combination of a frame comprising a tie-bar, a pedestal connected to said bar and comprising a top and legs at the ends of the top, a journal box confined between the legs of the pedestal, an axle extending into one end of the box, a roller bearing between the axle and said box, and retaining means for said box comprising coacting surfaces on the top of the pedestal and the box which permit said box to rock vertically.

9. In a car truck, the combination of a frame comprising a pedestal, said pedestal having vertically extending legs at the ends thereof, a box confined in the pedestal between said legs, an axle extending into one end of the box, a roller bearing between the axle and the box, and horizontally curved surfaces on the legs of the pedestal to permit the box to rock laterally.

Signed at Chicago, Illinois, this 3rd day of January, 1927.

LEE W. MELCHER.